United States Patent [19]

Koller

[11] 4,138,396
[45] Feb. 6, 1979

[54] PYRIDYL-AZO-INDOLYL CATIONIC DYES

[75] Inventor: Stefan Koller, Ramlinsburg, Switzerland

[73] Assignee: Ciba-Geigy Corporation, Ardsley, N.Y.

[21] Appl. No.: 778,656

[22] Filed: Mar. 17, 1977

Related U.S. Application Data

[63] Continuation of Ser. No. 644,771, Dec. 29, 1975, abandoned.

[30] Foreign Application Priority Data

Jan. 3, 1975 [CH] Switzerland .............................. 20/75

[51] Int. Cl.² ............................................ C09B 29/06
[52] U.S. Cl. .................................................... 260/156
[58] Field of Search ................................ 260/156, 165

[56] References Cited

U.S. PATENT DOCUMENTS

| | | | |
|---|---|---|---|
| 2,864,813 | 12/1958 | Bossard | 260/156 |
| 2,893,816 | 7/1959 | Tsang et al. | 260/165 X |
| 3,117,960 | 1/1964 | Illy | 260/165 X |
| 3,526,619 | 9/1970 | Haubrich | 260/165 |

FOREIGN PATENT DOCUMENTS 74-23823  3/1974  Japan.

*Primary Examiner*—Allen B. Curtis
*Attorney, Agent, or Firm*—Edward McC Roberts; Michael W. Glynn

[57] ABSTRACT

Cationic azo dyes of formula

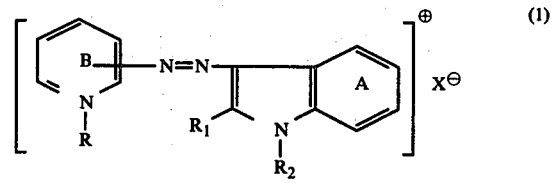

wherein R represents a substituted or unsubstituted alkyl radical, each of $R_1$ and $R_2$ represents hydrogen or a substituted or unsubstituted alkyl or aryl radical, $X^\ominus$ is the charge equivalent of an anion, and wherein the benzene ring A and the pyridine ring B are unsubstituted or substituted by non-ionogenic substituents, and wherein the cationic component does not contain any groups which exhibit acid dissociation in water.

1 Claim, No Drawings

PYRIDYL-AZO-INDOLYL CATIONIC DYES

This is a continuation of application Ser. No. 644,711, filed on Dec. 29, 1975, and now abandoned.

The present invention provides new cationic azo dyes, a process for their manufacture, a method of using them for dyeing or printing synthetic acid-modified textile fibres, and, in the form of an industrial product, the synthetic acid-modified fibrous material which has been dyed or printed with these dyes.

Accordingly, there are provided useful cationic azo dyes of formula

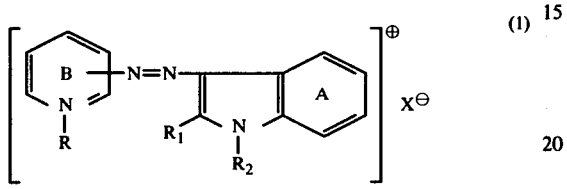
(1)

wherein R represents a substituted or unsubstituted alkyl radical, each of $R_1$ and $R_2$ represents hydrogen or a substituted or unsubstituted alkyl or aryl radical, $X^\ominus$ is the charge equivalent of an anion, and wherein the benzene ring A and the pyridine ring B are unsubstituted or substituted by non-ionogenic substituents and wherein the cationic component does not contain any groups which exhibit acid dissociation in water.

The pyridine ring B can be further substituted, in particular by lower alkyl groups, especially methyl groups, or by halogen atoms, for example chlorine, fluorine or bromine atoms.

Where the indole ring A is substituted, it carries, for example, lower alkyl and alkoxy groups as well as halogen atoms, such as chlorine or bromine atoms.

R is above all of a straight-chain alkyl radical and contains 1 to 4 carbon atoms. It can carry as substituents, for example, the phenyl group or a phenyl group which is substituted by chlorine, bromine or low molecular alkyl, the hydroxyl group, the cyano group, the carbamoyl group, a lower alkoxycarbonyl group, such as the carbomethoxy or carboethoxy group or a phenoxy group. Preferably R is methyl, benzyl or an alkyl radical of 2 to 3 carbon atoms which is unsubstituted or substituted by hydroxyl, cyano, carbamoyl or low molecular carbalkoxy.

The anion $X^\ominus$ can be derived from an inorganic or organic acid. As an inorganic anion, $X^\ominus$ represents, for example, the chlorine, bromine, iodine, phosphate or sulphate ion. As an organic ion, $X^\ominus$ represents, for example, acetate, low molecular alkylsulphate, for example methyl or ethyl sulphate, arylsulphonate, for example benzenesulphonate or p-toluenesulphonate. $X^\ominus$ can often be with advantage a complex ion, for example the trichlorozinc ion.

The term "low molecular" denotes that the group or the organic group component contains not more than 4 carbon atoms; it contains above all 1 to 2 carbon atoms.

An alkyl radical represented by $R_1$ and $R_2$ is preferably a low molecular alkyl group, for example a methyl, ethyl or butyl group, which is unsubstituted or substituted by cyano, hydroxy, chlorine, low molecular carbalkoxy, a phenyl group or a chlorine or bromine atom or by an alkylphenyl group containing 1 to 4 carbon atoms in the alkyl moiety.

An aryl radical represented by $R_1$ and $R_2$ is preferably the unsubstituted phenyl radical.

$R_1$ is preferably methyl or phenyl, whereas $R_2$ can also represent the substituted alkyl radicals, for example, benzyl, β-cyanoethyl, β-carboethoxyethyl, β-hydroxypropyl etc. Preferably, however, $R_2$ is hydrogen.

The new dyes of formula (1) can be obtained, for example, by quaternising a 2-aminopyridine of formula

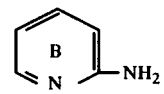
(2)

with an alkylating agent of formula R-X, wherein R is as defined in formula (1) and X is a radical which is split off as the anion $X^\ominus$ during the alkylation, diazotising the quaternised product and coupling it with an indole of formula

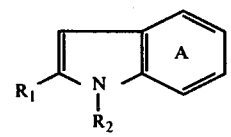
(3)

The preferred dyes of formula (1) are those wherein the pyridinium radical is attached in 4- or 3-position. They can be obtained by a process wherein the sequence of the reaction steps described hereinbefore is altered. Accordingly, a 3- or 4-aminopyridine of formula (2) is diazotised, coupled with an indole of formula (3) and the resultant azo compound of formula

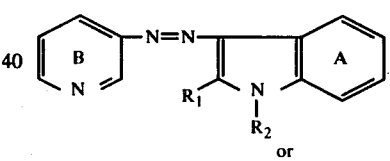
(4a)

or

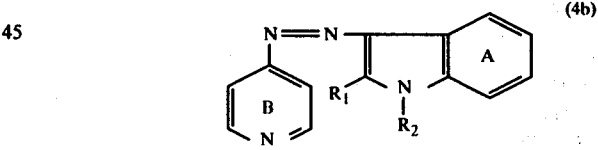
(4b)

is reacted with an alkylating agent of formula R-X. Compared with the process first described, the diazotisation and coupling of this process proceed more easily. Thus, for example, the diazotisation of the 2-aminopyridinium salts is carried out with nitrosylsulphuric acid in concentrated organic carboxylic acids, for example formic acid, acetic acid or propionic acid, and the subsequent coupling takes place in organic-acid medium at low temperatures. On the other hand, the diazotisation of 3- or 4-aminopyridines can be carried out by the conventional methods in aqueous solution with sodium nitrate and the coupling also takes place in an aqueous acid medium.

Examples of suitable aminopyridines of formula (2) are: 2-aminopyridine, 2-amino-3-, -4-, -5- or -6-methylpyridine, 2-amino-4-ethylpyridine, 2-amino-4,6-dimethylpyridine, 2-amino-5-chloro-, -fluoro- or -bromopyridine, 4-aminopyridine and, in particular, 3-aminopyridine, 6-chloro-3-aminopyridine and 3-amino-4-methylpyridine.

Examples of suitable coupling components of formula (3) are:

2-methylindole, 1-ethyl-2-methylindole, 1,2-diethylindole, 1-ethyl-2-methyl-5-methoxy- or -ethoxyindole, 1,2-dimethylindole, 1-butylindole, 1-ethyl-2,5-dimethylindole, 1-(β-cyanoethyl)-2-methylindole, 1-(β-chloroethyl)-2-methylindole, 1-(β-carboethoxy- or -carbopropoxyethyl)-2-methylindole, 1-(β-hydroxypropyl)-2-methylindole, 2-phenylindole, 1-methyl-2-phenylindole and 1-ethyl-2-phenylindole.

Possible alkylating agents R-X are, for example, the unsubstituted or substituted alkyl esters or aralkyl esters of a hydrogen halide, for example the methyl, ethyl, n-propyl, n-butyl, β-cyanoethyl, β-methoxycarbonylethyl, β-carbamoylethyl or benzyl esters of hydrochloric, hydrobromic or hydroiodic acid; the dialkylsulphates, for example dimethyl or diethyl sulphate; the alkyl esters of an organic sulphonic acid, for example the methyl, β-chloroethyl, ethyl and butyl esters of benzenesulphonic acid or of p-toluenesulphonic acid; and also the bromoacetic or chloroacetic alkyl esters (containing one alkyl radical of preferably 1 to 4 carbon atoms). Instead of certain substituted alkanol esters, it is also possible to use their primary products, for example instead of β-cyanoethyl or β-carbamoylethyl chloride or bromide to use acrylonitrile or acrylic amide, as well as alkylene oxides, for example propylene oxide, epichlorohydrin in the presence of hydrochloric or hydrobromic acid or glacial acetic acid. The preferred quaternising agent, however, is dimethyl sulphate or diethyl sulphate.

The quaternisation of the aminopyridines of formula (2) or of the azo compounds of formulae (4a) or (4b) with the above reactive esters to give the cycloammonium compounds is advantageously carried out by heating both substances in an organic solvent that does not participate in the reaction. Suitable solvents are, for example, optionally halogenated or nitrated aromatic hydrocarbons, for example toluene, xylene, halo- or nitrobenzene, optionally halogenated aliphatic hydrocarbons, for example chloroform, trichloroethylene, tetrachloroethylene, tetrachloroethane or trichloroethane, or water-miscible organic solvents, especially aliphatic or cycloaliphatic ketones, for example acetone, methyl ethyl ketone or methyl isobutyl ketone or cyclohexanone; medium alkanols, for example propanol, isopropanol, butanols or amyl alcohols; and also dioxan, dimethyl sulphoxide, tetrahydrofuran, methylpyrrolidone and dimethyl formamide. It is advantageous to carry out the process in the presence of acid acceptors, for example sodium or potassium acetate, calcium, sodium or potassium carbonate or magnesium oxide.

The cationic dyes of formula (1) are obtained in the form of salts of the acids of the alkanol or aralkanol esters used for their manufacture, that is to say of salts of inorganic or organic acids. These are primarily halides, such as chlorides, bromides or iodides, alkylsulphates, for instance methosulphates and ethosulphates, benzenesulphonates or p-toluenesulphonates. If desired, it is also possible to obtain salts of other acids by double reaction in a suitable polar solvent, for example oxalates by addition of oxalic acid. Double salts can also be obtained, for example with the dyestuff halides and corresponding zinc halides.

The precipitation of the dye salts obtained is brought to completion advantageously by adding sodium chloride and/or zinc chloride in aqueous acid solution and they are then isolated by filtration.

The cationic azo dyes of formula (1) are readily soluble in water. From an aqueous, neutral or weakly acid solution, optionally in the presence of wetting agents with dispersant action, for example in the presence of condensation products of alkylene oxides with soluble alkanols, they exhaust onto synthetic acid-modified fibrous material substantially to completely, with heating in an open or closed vessel under pressure, and produce on this material bright, yellow or scarlet, level dyeings which are fast to washing, decatising and light. The cationic azo dyes, together with known cationic dyes, are also suitable for producing useful combination dyeings. They also have a good pH stability.

Surprisingly, the quaternised dyes of formula

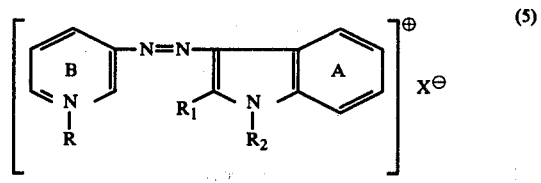

(5)

yield brilliant yellow shades, although in formula (5) the positive charge at the pyridine nitrogen atom cannot be delocalised to the indole nitrogen, as is the case with dyes derived from the 2- and 4-aminopyridines. Despite delocalisation not being possible, surprisingly productive dyes are also obtained with 3-aminopyridine. This fact is especially worthy of note, because the dyes of formula (5) are more easily obtainable than the products derived from 4-aminopyridine and, in particular, 2-aminopyridine.

Examples of suitable synthetic acid-modified fibrous material with which the cationic dyes of the present invention can be dyed or printed are acid-modified polyamides, for example polycondensation products of 4,4'-diamino-2,2'-diphenyldisulphonic acids or 4,4'-diamino-2,2'-diphenylalkanedisulphonic acids and polyamide-forming starting materials, polycondensation products of monoaminocarboxylic acids or their amide-forming derivatives or dibasic carboxylic acids and diamines with aromatic dicarboxysulphonic acids, for example polycondensation products of caprolactam or hexamethylenediammonium adipate with potassium-3,5-dicarboxybenzene-sulphonate, or acid-modified polyester fibres, for example polycondensation products of aromatic polycarboxylic acids, for example terephathalic acid or isophthalic acid, with polyhydric alcohols, for example ethylene glycol and 1,2- or 1,3-dihydroxy-3-(3-sodium sulphopropoxy)propane, 2,2-dimethylol-1-(3-sodium sulphopropoxy)butane, or 3,5-dicarboxybenzenesulphonic acid or sulphonated terephthalic acid or sulphonated diphenyl-4,4'-dicarboxylic acid. Preferred fibrous material is that from polyacrylonitrile or from polyacrylonitrile copolymers, in which latter case the copolymer contains preferably at least 80 percent by weight of acrylonitrile. Besides the acrylonitrile, other vinyl compounds are normally used as co-monomers, for example vinylidene chloride, vinylidene cyanide, vinyl chloride, methacrylates, methyl vinyl pyridine, N-vinylpyrrolidone, vinyl acetate, vinyl alcohol or styrenesulphonic acids.

The invention is illustrated by the following Examples, in which the parts are by weight unless otherwise stated. The relationship between parts by weight and parts by volume is the same as that between the gram and the cubic centimeter.

EXAMPLE 1

4.72 parts of the dye of formula

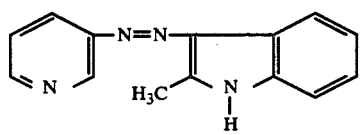

are suspended at 100° C. in 100 parts by volume of chlorobenzene. Then 0.5 part of magnesium oxide is added and 5 parts of dimethyl sulphate are added dropwise in the course of 5 minutes. The reaction mixture is kept for 30 minutes at 100° C. and the dye salt of formula

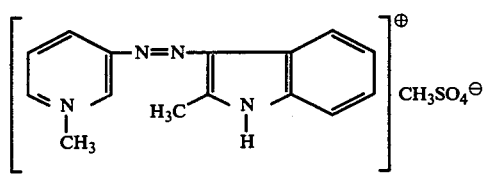

precipitates in crystalline form. The dye is filtered off and dried at 70° C. in vacuum. It dyes polyacrylonitrile, acid-modified polyamide and acid-modified polyester fibres in yellow shades from an acetic acid bath. The dyeings have very good fastness to light and decatising. The azo compound used in this Example as starting material is obtained by diazotising 3-aminopyridine in conventional manner and coupling it with 2-methylindole.

EXAMPLE 2

5.96 parts of the dye of formula

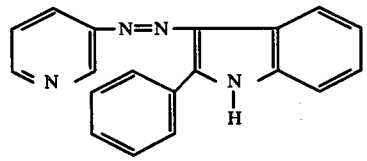

are suspended at 100° C. in 100 parts by volume of chlorobenzene. Then 0.5 part of magnesium oxide is added followed by the dropwise addition of 5 parts of dimethyl sulphate in the course of 5 minutes. The reaction mixture is kept for 1 hour at 110° C. and the dye salt of formula

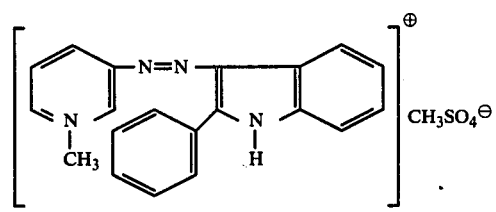

precipitates in crystalline form. The precipitate is filtered off at 40° C., washed with a small amount of chlorobenzene and dried in vacuo at 70° C. The resultant dye dyes polyacrylonitrile, acid-modified polyamide and acid-modified polyester fibres in golden yellow shades. The dyeings have excellent fastness to light and decatising. The azo compound used in this Example as starting material is obtained by diazotising 3-aminopyridine and coupling it to 2-phenylindole in the conventional way.

EXAMPLE 3

2.98 parts of the dye of formula

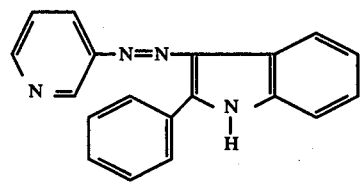

are dissolved in 4.5 parts by volume of glacial acetic at 20° C. Then 4 parts of ethylene oxide are passed in over the course of 2 hours. The reaction solution is then diluted with 200 parts of water and sodium chloride is added, whereupon the dye salt of formula

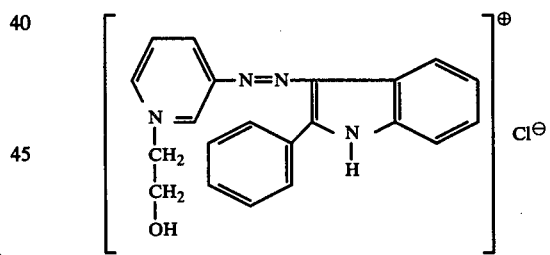

precipitates in crystalline form. The dye is filtered off and dried at 70° C. in vacuo. It dyes polyacrylonitrile, acid-modified polyamide and acid-modified polyester fibres from an acetic acid both in golden yellow shades which have very good fastness to light and decatising. The dyes listed in the following table are obtained in analogous manner:

Table 1

| Example | diazo component | coupling component | quaternising agent | shade on polyacrylonitrile |
|---|---|---|---|---|
| 4 | 3-aminopyridine | 1,2-dimethylindole | dimethyl sulphate | greenish yellow |
| 5 | " | 2-methylindole | benzyl bromide | " |
| 6 | " | 1-(β-cyanoethyl)-2-methylindole | dimethyl sulphate | " |
| 7 | " | 1-methyl-2-phenyl-indole | " | golden yellow |
| 8 | " | " | ethylene oxide | " |
| 9 | " | " | bromopropionic ethyl ester | " |
| 10 | " | 2-phenylindole | β-bromopropionic-amide | " |

Table 1-continued

| Example | diazo component | coupling component | quaternising agent | shade on polyacrylonitrile |
|---|---|---|---|---|
| 11 | " | " | 1,2-propylene oxide | " |
| 12 | " | " | epichlorohydrin | " |
| 13 | " | " | glycidyl alcohol | " |
| 14 | " | " | acrylic amide | " |
| 15 | " | " | 3-phenoxy-1,2-epoxypropane | " |
| 16 | " | 1-(β-hydroxybutyl)-2-phenylindole | dimethyl sulphate | " |
| 17 | " | 1-(β-hydroxypropyl)-2-phenylindole | " | " |
| 18 | 6-chloro-3-aminopyridine | 2-methylindole | dimethyl sulphate | yellow |
| 19 | 2-chloro-3-aminopyridine | 2-phenylindole | " | golden yellow |
| 20 | 4-methyl-3-aminopyridine | " | " | " |

EXAMPLE 21

5.96 parts of the dye of formula

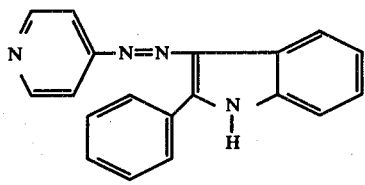

are suspended together with 0.5 g of magnesium oxide in 50 parts by volume of tetrachloroethane. Then 5 parts of dimethyl sulphate are added dropwise and the mixture is heated, with good stirring, to 100° C. After 1 hour the solvent is removed by steam distillation. To the residual aqueous solution are added, 5 parts of zinc chloride and 50 parts of sodium chloride, whereupon the dye salt of formula

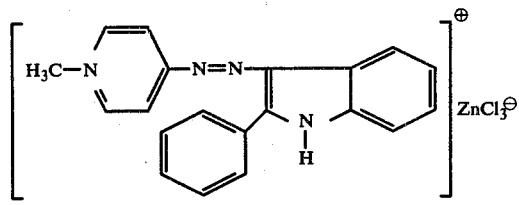

precipitates. It dyes polyacrylonitrile fibres from an acetic acid bath in scarlet shades of outstanding fastness to light and decatising. The water-insoluble dye used as starting material in this Example is obtained in conventional manner by diazotising, 4-aminopyridine and subsequently coupling it to 2-phenylindole. The following dyes can be obtained in analogous manner.

Table 2

| Example | diazo component | coupling component | quaternising agent | shade on polyacrylonitrile |
|---|---|---|---|---|
| 22 | 4-aminopyridine | 1-(β-hydroxyethyl)-2-phenylindole | dimethyl sulphate | scarlet |
| 23 | " | 1-(β-cyanoethyl)-2-phenylindole | " | " |
| 24 | " | 2-phenylindole | 1,2-propylene oxide | " |
| 25 | 3,5-dichloro-4-aminopyridine | " | dimethyl sulphate | " |

EXAMPLE 26

4.4 parts of 1-methyl-2-amino-pyridinium-methosulphate are dissolved in a mixture of 10 parts by volume of glacial acetic acid and 10 parts by volume of propionic acid. To this solution is added dropwise 3.5 parts by volume of nitrosylsulphuric acid (corresponding to 1.38 parts of sodium nitrite) in the course of 15 minutes at −15° to −10° C. The resultant diazo solution is subsequently treated with a solution of 3.8 parts of 2-phenylindole in 30 parts by volume of glacial acetic acid. After it has been stirred briefly at −10° C., the reaction mixture is poured onto 500 parts of ice and the pH is adjusted to 4 with sodium acetate. The dye of formula

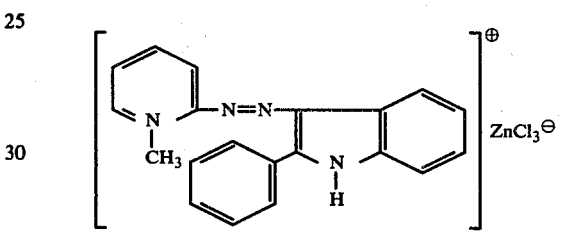

is precipitated by adding zinc chloride and sodium chloride. It is filtered off, washed with sodium chloride solution and dried. This dye dyes polyacrylonitrile fibres from an acetic acid bath in scarlet shades. The dyeings have outstanding fastness to light, decatising and washing. Dyes which yield scarlet dyeings with a similar degree of fastness are obtained by using instead of 2-phenylindole equimolar amounts of 1-methyl-2-phenylindole or 1-(β-hydroxyethyl)-2-phenylindole.

I claim:

1. Cationic azo dyes of formula

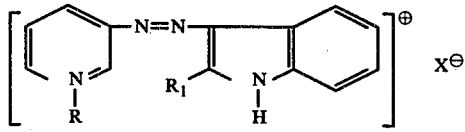

wherein R represents methyl, benzyl or an alkyl radical of 2 to 3 carbon atoms which is unsubstituted or substituted by hydroxyl, cyano, carbamoyl or low molecular carbalkoxy, $R_1$ represents methyl or phenyl, and $X^\ominus$ is the charge equivalent of an anion.

* * * * *